Jan. 4, 1938.    C. J. SURDY    2,104,061
TRANSMISSION CONTROL MECHANISM
Filed April 5, 1935

INVENTOR.
Charles J. Surdy

Patented Jan. 4, 1938

2,104,061

UNITED STATES PATENT OFFICE 2,104,061

TRANSMISSION CONTROL MECHANISM

Charles J. Surdy, Tuckahoe, N. Y., assignor to Bendix-Westinghouse Automotive Air Brake Company, Pittsburgh, Pa., a corporation of Delaware Application April 5, 1935, Serial No. 14,929

5 Claims. (Cl. 192—3.5)

This invention relates particularly to controlling means for the power transmission system in motor vehicles.

It is an object of this invention to provide, in a motor vehicle transmission mechanism which includes a plurality of gear selecting or controlling elements, the improvement which consists of power mechanism for operating one of such elements.

More specifically, my invention has as another object, the provision of a control device for the above described construction, and in which the gear shift lever operates the control device in a manner to effect proper selection of gear trains within the transmission mechanism.

Another object of my invention is to provide a power mechanism for actuating automotive transmission devices, the power mechanism being operable upon slight movement of the gear shift lever in a direction which is coincident with its gear train selecting movement to effect immediate movement of corresponding transmission devices.

A further object of my invention resides in an improved valve for controlling the operation of a servo-motor, especially a motor which is adapted for actuating a clutch or other automotive transmission devices.

Figure 1:
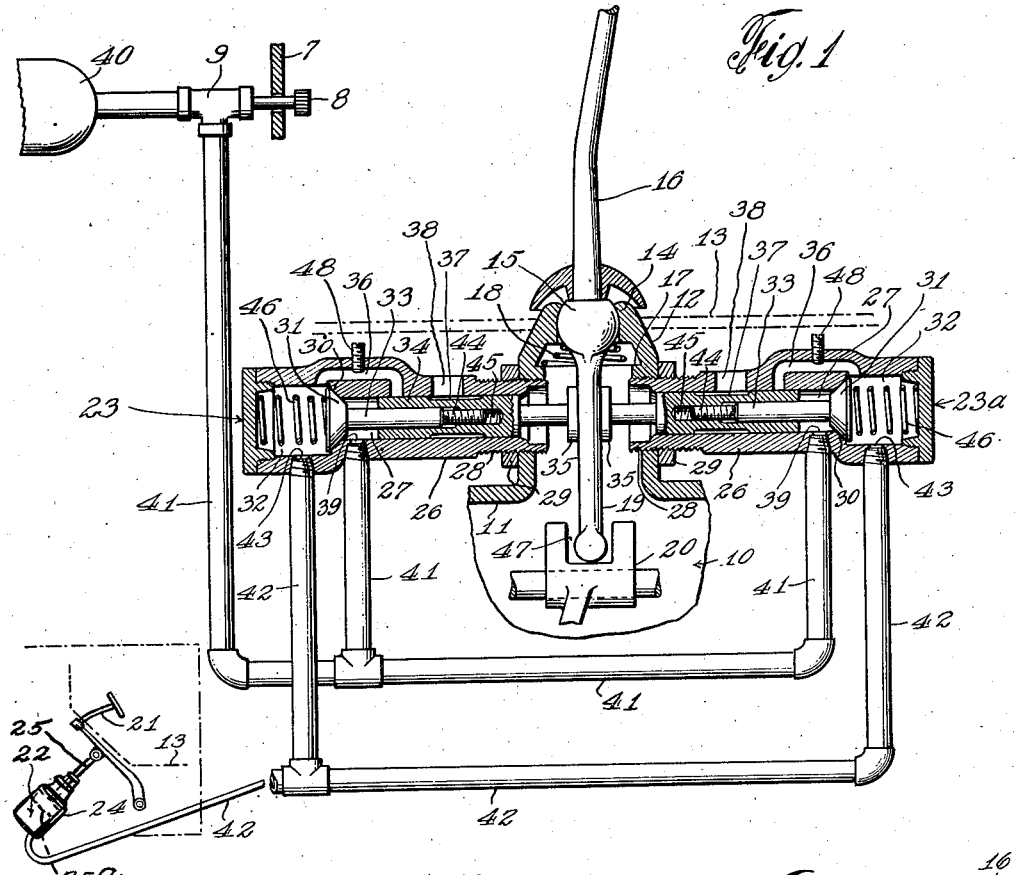
Figures 2, 3:
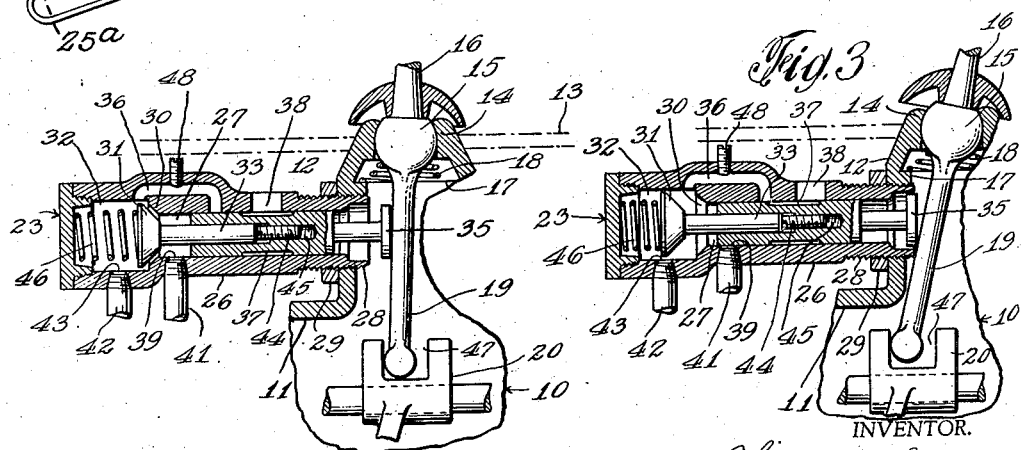

Other objects and advantages of my invention will be apparent from the following description taken in connection with the following drawing in which, Fig. 1 is a longitudinal sectional view of a portion of an automotive transmission showing my invention in similar section, with parts thereof shown diagrammatically;

Fig. 2 is a fragmentary view of Fig. 1, showing the control valve in its initial position; and Fig. 3 is a view similar to Fig. 2 with the control valve in another position.

On this drawing, 10 illustrates a motor vehicle transmission casing including a cover 11 with which is formed the gear shift lever tower 12 usually projecting above the vehicle floor board 13. At its upper side, the tower 12 is provided with a spherical seat 14 in which is received a ball member 15, forming a pivot point for the manually operable gear shift lever or actuator 16. Below the seat 14, the tower 12 is provided with a ledge 17 forming a seat for a spiral spring 18 which firmly retains the ball member 15 of the shift lever 16 in a desired position, as will be hereinafter pointed out.

The shift lever or actuator 16 has a control portion 19 below the ball member 15 arranged to selectively engage any one of a number of gear train selecting or shifting members or forks 20, only one of which has been shown. Movement of the forks 20 by the control portion 19 of the shift lever 16 causes engagement of any predetermined gear train for operating the motor vehicle at any desired speed. However, before it is possible to cause engagement of any gear train, the clutch must first be disengaged by depressing the clutch operating pedal 21. Since the clutch itself is a well known part of a motor vehicle transmission mechanism, it is not necessary to illustrate or describe it here in detail.

I provide power mechanism for actuating the clutch of the transmission mechanism and this power mechanism comprises a vacuum operated motor 22 and a control valve 23 therefor. The motor 22 includes a cylinder 24 housing a piston 25a to which is connected a rod 25 attached to the clutch operating pedal 21. The control valve 23 comprises a casing 26 having a bore 27 and a threaded portion 28 which is screwed into the tower 12 and locked in any desired position by a jam nut 29. At the threaded portion 28 of the casing 26, the bore 27 opens into the interior of the tower 12, while the opposite end of the bore is beveled to form a seat 30 for a valve element 31 which controls communication between the bore 27 and a chamber 32 at the outer end of the casing 26.

The valve element 31 has a stem 33 which fits within the cylindrical plug 34 mounted in the bore 27 and having a button 35 in operative relation with the control portion 19 of the shift lever 16, whereby the lever may operate the control valve 23. Extending between the chamber 32 and the bore 27 is a port 36 which is arranged to communicate with atmosphere when the plug 34 is moved to a position whereby the portion 37 thereof having a reduced diameter connects one end of said port 36 with the atmospheric opening 38. Between the beveled seat 30 and the adjacent end of the plug 34, the casing 26 is provided with a port 39 having communication with the intake manifold 40 of an internal combustion engine through the medium of the piping 41. The valve 9, having an operating button 8 on the dash board 7, may be utilized for shutting off the vacuum supply at the will of the vehicle operator. Piping 42 leads from the port 43 of the chamber 32 and communicates with one end of the servo-motor cylinder 24.

Since the fork 20 is movable longitudinally in both directions for causing selective engagement of the desired gear train, a duplicate control valve 23a is threaded into the tower 12 opposite the control valve 23. In its detail construction, this control valve is precisely the same as the described control valve 23. Because of the different range of movement of the gear shift lever 16 on each side of its mid-point, each valve 23, 23a of the power mechanism is made adjustable so that it can be set in a position to be controlled or limited, together with the manually operable lever 16, in accordance with the range of movement of the shifter fork 20.

The means for so adjusting the control valve 23 or 23a consists in providing each valve casing 26 with the threaded portion 28 and also by providing each plug valve 34 with a set screw 44 which may be screwed longitudinally within the tapped hole 45 in any desired position to properly adjust the control valve 23, as will be more fully described.

Thus, with the gear shift lever 16 in neutral position, as shown in Fig. 1, the left side of the plug 34 will be in the position as shown, but upon full engagement of a gear train, the left side of the plug 34 will be in the position shown in Fig. 3. These two views represent the travel of the plug 34 during one complete engagement of a gear train. Should it be found that the movement of the shift lever is greater in the opposite direction, the control valve may be adjusted to suit this condition. This adjustment is accomplished by screwing the desired valve casing 26 and also the set screw 44 outwardly a like distance.

In operation of my device, and with the engine of the vehicle in motion, a vacuum will be formed within each bore 27 of the valve casings 26 between the plugs 34 and the valve elements 31 by reason of the piping 41 which leads from the intake manifold 40. With the shift lever 16 in neutral position, the spring 46 within the chamber 32 seats the valve element 31 to close communication between said chamber and the vacuumed portion of the bore 27. When it is desired to select a gear train, the shift lever 16 is manipulated manually, and it will be observed that its control portion 19 is received in the slot 47 of the fork 20 having sufficient clearance so that initial movement of the lever 16 will not move the fork 20 but causes movement of the plug 34 and the valve element 31 of the control valve 23, as clearly shown in Fig. 2.

In this manner, the valve element 31 will open communication between the chamber 32 and intake manifold 40 whereby a vacuum will exist in the piping 42 and in the cylinder 24 for causing the clutch operating pedal 25 to be moved for disengaging the clutch. Whereupon, the continued movement of the shift lever 16 in a direction which is coincident with its gear train selecting movement will complete the engagement of the selected gear train and the valve element 31 and plug 34 will be in the position as shown in Fig. 3. The engagement of the selected gear train will limit further operation of the control valve 23, but if desired, the inner end of each valve casing 26 may form a stop for preventing further movement of the shift lever, as shown in Fig. 3.

As soon as the plug 34 assumes the position shown in Fig. 3, it will close the port 39 and connect the chamber 32 with atmosphere by reason of the reduced diameter portion 37 of the plug 34 connecting the port 36 with the atmospheric opening 38. In this manner, the vacuum condition within the cylinder 22 will become atmospheric, causing engagement of the clutch. The port 36 may be variably restricted by means of a set screw 48 whereby the desired rate of clutch engagement may be attained. When the shift lever is in a position such as shown in Fig. 3, its accidental movement is prevented by the spiral spring 18 which firmly presses the ball member 15 against its spherical seat 14.

Movement of the shift lever manually in the opposite direction from that shown in Fig. 3 will first cause the plug 34 to uncover the port 39 and close the port 36, thereby causing the servomotor 22 to disengage the clutch so that it will be disengaged during the period when the previously selected gear train is disconnected. Movement of the shift lever 16 toward the opposite side of its mid-point will operate the control valve 23a in a manner precisely as described in connection with the valve 23 for actuating the servo-motor 22.

From the foregoing, it will be apparent that my invention enables the vehicle operator to control the several steps which are necessary to cause selective engagement of any gear train by a power mechanism which is in operative relation with the shift lever and arranged to be controlled thereby. It will be apparent that operation of the control valve 23, 23a does not require any special movement of the gear shift lever, but is accomplished during the customary movement thereof.

I claim:

1. In a transmission mechanism including a clutch control element and a casing adapted to house a plurality of gear trains, the combination including means arranged to selectively actuate such gear trains to operative positions, such means comprising a shiftable member arranged to engage at least one of said gear trains and an actuator for shifting said member, said actuator having a lost motion connection with said member, a source of fluid power, fluid means for actuating said clutch control element comprising a cylinder having a piston therein operatively connected to said clutch control element, means providing a passage between the source of fluid power and the cylinder for operating said piston, and a valve device interposed in said passage for controlling the flow of fluid power from said source to said cylinder, said valve device including an element in contacting relation with said actuator and resilient means tending to move said valve device to a position for interrupting communication between the source of fluid power and said cylinder, said actuator being arranged, upon initial actuation thereof in the course of its gear train selecting movement but prior to movement of said shiftable member by said actuator, to move said valve device against the tension of said resilient means for establishing communication between the source of fluid power and the cylinder.

2. In a transmission mechanism including a clutch control element and a casing adapted to house a plurality of gear trains, the combination including means arranged to selectively actuate such gear trains to operative positions, such means comprising a shiftable member arranged to engage at least one of said gear trains and an actuator for shifting said member, said actuator having a lost motion connection with said member, a source of fluid power, fluid means for actuating said clutch control element comprising a cylinder having a piston therein operatively connected to said clutch control element, means providing a passage between the source of fluid power and the cylinder for operating said piston, and a valve device interposed in said passage for controlling the flow of fluid power from said source to said cylinder, said valve device including an element in contacting relation with said actuator and resilient means tending to move said valve device to a position for interrupting communication between the source of fluid power and said cylinder, said actuator being arranged, upon initial actuation thereof in the course of its gear train selecting movement but prior to movement of said shiftable member by said actuator, to move said valve device against the tension of said resilient means for establishing communication between the source of fluid power and the cylinder, said actuator maintaining said valve device in a position to establish communication between the source of fluid power and said cylinder upon continued movement of said shiftable member by said actuator in the course of its gear train selecting movement.

3. In a transmission mechanism including a clutch control element and a gear shifting member, power means for operating said element, an actuator for operating said member, means including a lost motion connection for connecting said actuator and member, and means controlled by operation of said actuator during movement thereof to take up said lost motion connection for energizing said power means.

4. In a transmission mechanism including a clutch control element and a gear shifting member, an actuator for shifting said member, means including a lost motion connection for connecting said actuator and member, a source of fluid power, fluid means for actuating said clutch control element including a pressure responsive member operatively connected with the clutch control element, a connection between said source and fluid means, a valve in said connection, and means connecting said valve and actuator, whereby movement of said actuator to take up said lost motion connection will operate said valve to connect the source and fluid means before the actuator shifts the gear shifting member.

5. In a transmission mechanism including a clutch control element and a gear shifting member shiftable to establish one of a plurality of desired gear relations, a casing for said member, an actuator pivotally mounted in said casing and having an end operatively connected with said member through a lost motion connection, a source of fluid power, fluid means operatively associated with the clutch control element for controlling clutch disengaging and engaging movements thereof, means including a valve for controlling the communication between said fluid means and source of fluid power, and means connecting said valve and actuator between the pivotal mounting of the latter and the end thereof associated with said member, whereby movement of said actuator in said mounting in a direction to take up said lost motion connection will operate said valve before moving said member.

CHARLES J. SURDY.